United States Patent
Radgowski (10) Patent No.: US 12,212,135 B2
(45) Date of Patent: Jan. 28, 2025

(54) USING WAVEFORM DATA TO IDENTIFY AN INSPECTION ZONE FOR A RESOURCE DISTRIBUTION SYSTEM

(71) Applicant: Landis+Gyr Technology, Inc., Alpharetta, GA (US)

(72) Inventor: John Radgowski, Midlothian, VA (US)

(73) Assignee: Landis+Gyr Technology, Inc., Alpharetta, GA (US)

(*) Notice: Subject to any disclaimer, the term of this patent is extended or adjusted under 35 U.S.C. 154(b) by 342 days.

(21) Appl. No.: 17/687,252

(22) Filed: Mar. 4, 2022

(65) Prior Publication Data
US 2022/0285980 A1  Sep. 8, 2022

Related U.S. Application Data

(60) Provisional application No. 63/156,992, filed on Mar. 5, 2021.

(51) Int. Cl.
*H02J 13/00* (2006.01)
*G05D 1/00* (2006.01)
(Continued)

(52) U.S. Cl.
CPC ...... *H02J 13/00002* (2020.01); *G05D 1/0011* (2013.01); *G05D 1/0088* (2013.01);
(Continued)

(58) Field of Classification Search
CPC .............. G06Q 50/06; H02J 13/00002; H02J 2203/10; H02J 3/001; G05D 1/0088; G05D 1/0094
See application file for complete search history.

(56) References Cited

U.S. PATENT DOCUMENTS 10,495,677 B2 * 12/2019 Parashar ................ G01R 31/40
10,739,396 B2 *  8/2020 Biswas ............. H02J 13/00034
(Continued)

FOREIGN PATENT DOCUMENTS

WO   2019/032761 A1   2/2019

OTHER PUBLICATIONS

PCT/US2022/018973, International Search Report and Written Opinion, Jul. 12, 2022, 17 pages.

*Primary Examiner* — Vincent H Tran
(74) *Attorney, Agent, or Firm* — Kilpatrick Townsend & Stockton LLP (57) ABSTRACT

Temporary outages or degradation of a resource, such as electric power, may be detected by identifying anomalies in waveform data collected by collection points. The collection points may be distributed throughout a resource distribution system and configured to communicate data to a headend system. The headend system processes the data to identify anomalies and to correlate waveform data collected by different collection points. The geographic locations of the collection points with correlated data are used to identify a geographic region. An unmanned aerial vehicle may be used to conduct an inspection of the geographic region and to collect inspection data. The inspection data may be communicated to the headend system. The waveform data and the inspection data may be used to determine the correct resources to deploy to address the cause of the anomaly.

16 Claims, 5 Drawing Sheets

(51) Int. Cl.
    *G06Q 50/06* (2012.01)
    *H02J 3/00* (2006.01)
(52) U.S. Cl.
    CPC ........... *G05D 1/0094* (2013.01); *G06Q 50/06* (2013.01); *H02J 3/001* (2020.01)

(56) References Cited

U.S. PATENT DOCUMENTS

| | | |
|---|---|---|
| 2007/0183369 A1 | 8/2007 | Angelis |
| 2013/0054183 A1* | 2/2013 | Afzal ................ H02J 13/00002 |
| | | 702/141 |
| 2018/0330242 A1* | 11/2018 | Dubois .................. G06Q 50/06 |
| 2018/0364874 A1* | 12/2018 | Herlong, II ....... H02J 13/00001 |
| 2019/0011920 A1 | 1/2019 | Heinonen et al. |
| 2019/0067941 A1* | 2/2019 | Smith .................. H02J 3/00125 |
| 2019/0187677 A1* | 6/2019 | Lv .............................. H02J 3/00 |
| 2020/0041560 A1* | 2/2020 | Schwartz ............... G06N 3/045 |
| 2020/0292608 A1* | 9/2020 | Yan ........................ G06N 3/044 |
| 2020/0401138 A1 | 12/2020 | Rentz et al. |
| 2023/0082184 A1* | 3/2023 | Wang ................ H02J 13/00034 |
| | | 706/11 |

\* cited by examiner

USING WAVEFORM DATA TO IDENTIFY AN INSPECTION ZONE FOR A RESOURCE DISTRIBUTION SYSTEM

RELATED APPLICATION

This application claims priority to U.S. Patent Application No. 63/156,992 filed Mar. 5, 2021, the entire contents of which is incorporated herein by reference.

TECHNICAL FIELD

The present disclosure relates to the identification of anomalies in a resource distribution system, specifically the use of power parameter data collected from various points in the resource distribution network and images received from a geographic region to identify a resource to address the cause of the anomaly.

BACKGROUND

When there is an outage or other problem with a resource distribution system, resource providers generally seek to address the problem as quickly as possible to minimize interruption of service experienced by the service provider's customers. For example, a storm may cause a branch to contact a power line or a transformer may fail resulting in a loss or degradation of power to premises connected to affected portions of an electric power grid. Temporary loss of power or degradation of power may be identifiable as anomalies in power parameter data detected by collection points, e.g., meters or sensors, distributed throughout the electric power grid. A problem, such as an outage, may appear the same to the customer regardless of the cause of the problem. However, determining the cause of the problem is important since the cause determines the type of equipment and resources needed to address the problem.

Currently, a resource provider may default to deploying the same type of equipment and resources to every problem regardless of the problem or the cause of the problem, or may require manual inspection to identify the cause of the problem prior to deploying equipment and resources to address the problem.

Additionally, some outages or faults are temporary, usually caused by a momentary fault on the resource distribution network. Temporary faults can give insight into where future sustained problems, such as outages may occur. For example, vegetation that intermittently contacts power lines may be the cause of a momentary fault. If the vegetation is not addressed, then it may eventually cause a more sustained fault. Although resource providers generally perform vegetation management around power lines, current vegetation management programs are based on schedules. A scheduled vegetation management program does not consider temporary fault information. Thus there is a need for an improved method of identifying the location and cause of anomalies and problems in a resource distribution network.

SUMMARY

The present disclosure includes a method for identifying anomalies in a resource distribution system and determining the equipment or resources needed to address the cause of the anomaly. Collection points, such as meters and sensors, are distributed throughout a resource distribution system. The collection points send power parameter data through a communications network to a remote system. In one implementation, the resource distribution system is a power distribution system and the remote system is a headend system.

The power parameter data is processed by a processing unit at the headend system, or at a computing device located outside of the headend system. The power parameter data is processed to determine whether an anomaly is present in the power parameter data. When an anomaly is identified in the power parameter data collected at a first collection point, power parameter data may be considered from additional collection points to identify other collection points with power parameter data that correlates to the power parameter data from the first collection point that exhibited the anomaly.

Once the system identifies a set of collection points with power parameter data that correlates, the system uses topological information for the power distribution system to determine a geographic region that encompasses the locations of the collection points in the set of collection points. The topological information includes geographic location information for the collection points and the assets in the resource distribution system, as well as relative location information that can be used to determine whether one asset or collection point is upstream or downstream of another asset or collection point in the resource distribution system. The geographic region may also include locations of other collection points with power parameter data that loosely correlates with the power parameter data that exhibited the anomaly or locations of assets whose locations relative to the set of collection points indicate that they may be relevant to the anomaly.

Once the geographic region is determined, an unmanned aerial vehicle may be deployed to the geographic region. The unmanned aerial vehicle collects data from the geographic region, including image data of the portion of the resource distribution system within the geographic region. Based on the correlated power parameter data and the inspection data collected by the unmanned aerial vehicle, the resources needed to address the cause of the anomaly may be identified and deployed.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

The present invention provides a system that uses power parameter data collected at multiple collection points in a resource distribution system and image data of a geographic region associated with the collection points to timely and efficiently respond to problems in the distribution network. The collection points may be associated with assets or devices in the network or may be dedicated collection points. Each collection point monitors one or more parameters of the resource at that point and collects data related to the monitored parameter.

A collection point may analyze the data or may send the data to another device for analysis. The analysis determines whether the data indicates that there is an anomaly indicating a potential problem. If there is an anomaly, then the system may analyze data from other collection points to determine whether the potential problem was also detected by other collection points.

The system determines the geographical region that includes the collection points identified as having detected the potential problem. Once the geographical region is identified, then the system deploys an unmanned aerial vehicle (UAV) or drone to collect images or data from the geographical region and possibly adjacent geographical regions. The images and data from the UAV, as well as the data collected from the collection points are used to identify the type and scope of the problem. Once the problem is identified, the equipment and resources needed to address the problem are deployed to the correct location.

Exemplary Power Distribution System

Figure 1:
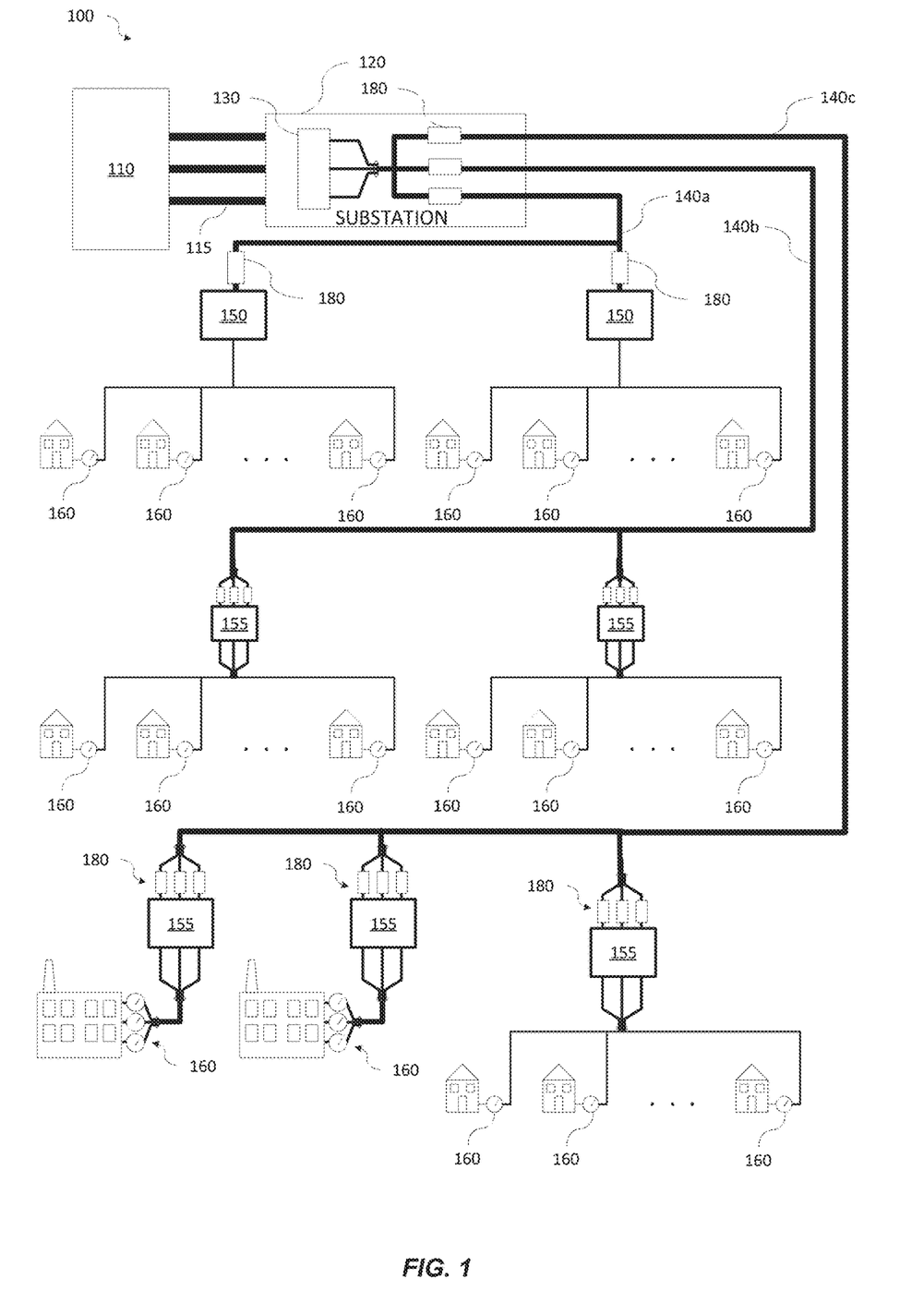
FIG. 1 is a block diagram illustrating a portion of an exemplary power distribution system.

The present invention may be implemented in an electrical power distribution system, as shown in FIG. 1. The illustrated portion of the electrical power distribution system 100 includes electrical power generation facility 110. The power generated by power generation facility 110 may be, for example, 3-phase alternating current (AC) power. In a three-phase power supply system, three conductors carry an alternating current of the same frequency and voltage amplitude relative to a common reference, but with a phase difference of one-third of a cycle between each. The electrical power may be transmitted at high voltage (e.g., around 140-750 kV) via transmission lines 115 to an electrical power substation 120.

At the electrical power substation 120 a step-down transformer 130 may step down the high voltage power to a voltage level more suitable for customer usage, referred to as a distribution or "medium" voltage, typically around 13 kV. The stepped down 3-phase power may be transmitted via feeders 140a, 140b, 140c to distribution transformers 150, 155 which may further step down the voltage (e.g., 120-240V for residential customers).

Each distribution transformer 150, 155 may deliver single-phase and/or 3-phase power to residential and/or commercial premises. From the distribution transformers 150, 155, electrical power is delivered to customer premises through electric meters 160. The electric meters 160 may be connected between the loads (e.g., the customer premises) and the distribution transformers 150, 155. Three-phase transformers 155 may deliver 3-phase power to customer premises.

The collection points may include electric meters 160, sensors 180, and other devices that sense one or more power parameters, such as frequency, voltage, current, power quality, or phase angle. Some sensors may be associated with power assets, such as substations or distribution transformers. Other sensors may be associated with locations along the distribution network, regardless of the presence of an asset. It should be appreciated that the illustrated locations of the sensors in FIG. 1 are merely exemplary and that sensors may be disposed at other locations and that additional or fewer sensors may also be used. Power assets other than those illustrated may also be included in the distribution system.

As can be seen from FIG. 1, each collection point is connected to one or more segments of the electrical power distribution system 100 (e.g., a meter is connected to a distribution transformer via a service drop). A headend system or another system may maintain topology information for the power distribution system. The topology information may include geographic location information for the meters, sensors, assets, and other devices in the network. The geographic location information may include latitude and longitude coordinates, street addresses, relative location information, or any other type of information that identifies the geographic location of the device. The topology information may also include connection information indicating how the devices are connected. For example, the topology information may indicate which meters are connected to a specific transformer or which sensors are associated with a specific substation. The topology information may be used to determine the relative positions of the collection points within the distribution system. For example, the topology information indicates whether one meter is located further downstream from a substation than another meter.

Exemplary Communications Network

Figure 2:
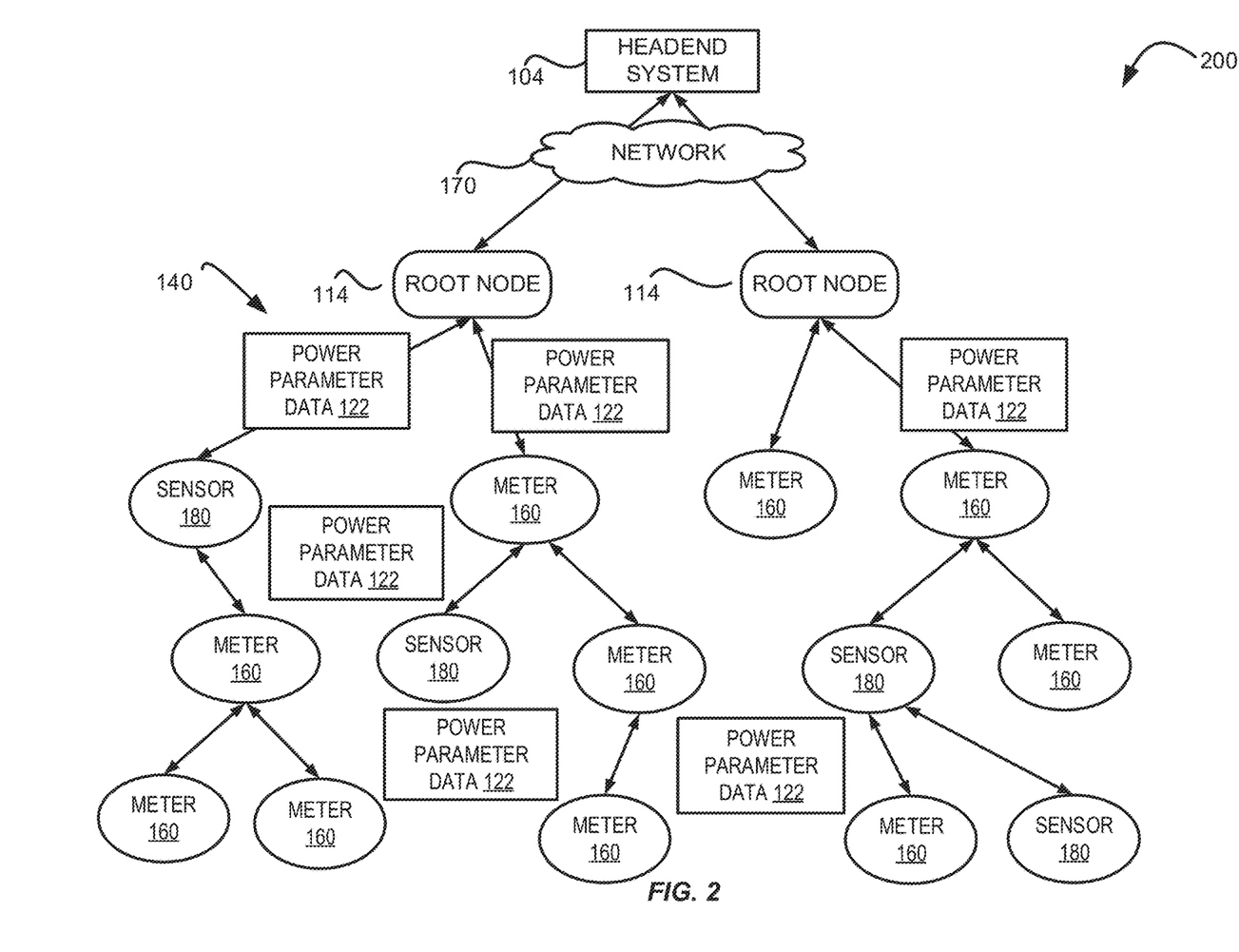
FIG. 2 is a block diagram illustrating a portion of an exemplary communications network for a power distribution system.

The collection points may communicate on a communications network, such as that illustrated in FIG. 2. As shown in FIG. 2, a wireless mesh network 140 allows collection points, such as electricity meters 160 and sensors 180 to communicate with other devices on the mesh network or with other remote devices, such as a headend system 104.

The meters 160 and sensors 180 can transmit data to their respective root nodes 114. The root nodes 114 may forward the received data to a remote system, such as headend system 104. A root node 114 can also be configured to measure and process data itself. The root nodes 114 may be personal area network (PAN) coordinators, gateways, or any other devices capable of communicating with the headend system 104 and the devices on the mesh network.

The root nodes 114 may transmit the collected data to the headend system 104 via another network 170 such as the Internet, an intranet, or any other data communications network. The headend system 104 can function as a central processing system that receives streams of data or messages from the root nodes 114. The headend system 104, or another system associated with the utility company, can process or analyze the collected data for various purposes, such as billing, performance analysis, or troubleshooting.

It should be further understood that the mesh network 140 communicatively connecting the meters, sensors and other devices may be separate from and can overlay the network for distributing electrical power in the electrical power distribution system 100. As such, two meters 160 that are neighbors in the mesh network 140 may not be neighbors, i.e., connected to each other, in the electrical power distribution system and vice versa.

The meters, sensors, and other devices may use communications networks other than the wireless mesh network illustrated in FIG. 2. The communications network may include a cellular network, a wired network, or a PLC (power line communication) network or may be a combination of multiple types of networks.

The collection points may send their power parameter data to the headend system periodically, may process the power parameter data and send the data based on the results of the processing, or may send the power parameter data or other information in response to a query from the headend system.

When the collection point is a meter, the meter may also collect information on the amount of energy consumed by the premises or load associated with the meter, including the time the energy was consumed. The meter may periodically transmit this information to the headend system. In some instances, the meter reports consumption information by reporting energy consumed during an interval. The meter may use one time period for an interval (e.g., a 15-minute interval or a 60-minute interval) and a different time period for reporting (e.g., once every 24 hours). The meter may send the power parameter data in the same communication used to send consumption information and may associate the power parameter data with the appropriate interval. Alternatively, the meter may send the power parameter using a different interval, a different schedule, or using other types of criteria.

Exemplary Correlation of Power Parameter Data

Figure 3:
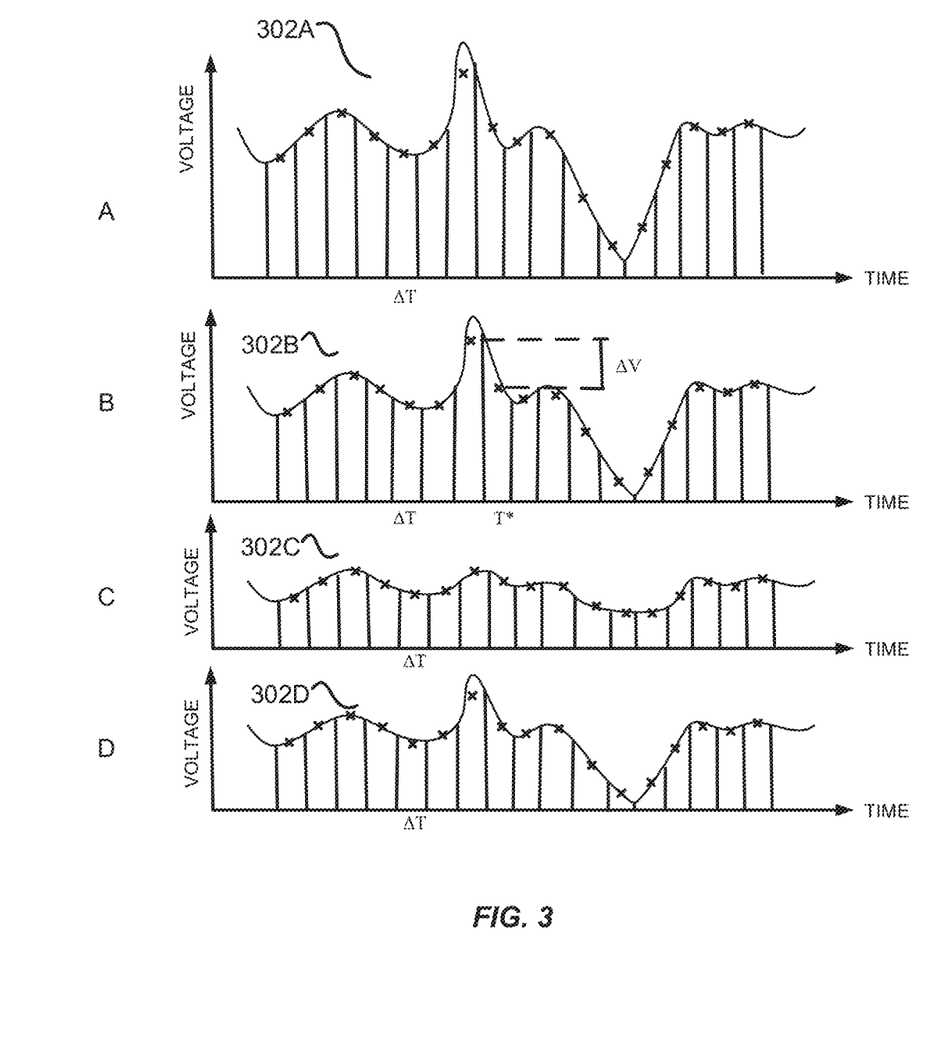
FIG. 3 illustrates an exemplary comparison of data received from multiple collection points.

After the headend system receives the power parameter data from the collection points, the system may process the data. FIG. 3 shows an example of processing voltage data. Other types of power parameters maybe correlated in a similar manner. FIG. 3 shows the voltage values measured at different time points by four different collection points, A, B, C, and D, respectively. As can be seen from the waveforms 302A-302D, there can be fluctuations (e.g., peaks or dips) in the voltage values over time. When a fluctuation is detected by one collection point, collection points that are connected to a common component, such as the same transformer or the same distribution line, may also detect the fluctuation at approximately the same time. Note that due to the resistance of the lines connecting the devices, the fluctuation may be attenuated.

To determine whether the waveform indicates a problem, the system may look for certain characteristics of the waveform, including certain values, ranges of values, or certain types of transitions or patterns. The system may consider one type of parameter, such as voltage, or may consider a combination of parameters. The characteristics may be initially predetermined, and may be refined over time as the system collects additional data and information about waveforms that correspond to various anomalies or out-of-range conditions. In some implementations a machine-learning model is used to determine the characteristics or the potential problem associated with a characteristic.

If the waveform or a portion of the waveform for collection point A shown in FIG. 3 is determined to be indicative of a problem, then the system searches for other collection points experiencing similar conditions. The system may optionally prioritize its search to initially consider other devices that are located within a certain distance from collection point A, that have a certain relationship with collection point A, or that are connected to a common asset. Other factors may also be used to prioritize the search for additional collection points including, but not limited to the asset or the type of asset associated with the collection point, collection points that previously correlated with the collection point, or system-specific factors.

If the system identifies waveforms for collection points B, C, and D as exhibiting similar conditions, it may compare the waveforms or portions of the waveforms to the waveform for collection point A. The comparison may use cross-correlations between the data for waveform 302A and the data for each of the other waveforms, 302B-302D. Other types of comparisons or correlations may also be used.

In the example of FIG. 3, the waveforms for collection points A, B, and D are found to correlate and the system groups the collection points in a set. The system may determine the geographical region that includes the set of collection points using the topological data for the electric distribution network. The geographic region may be defined with reference to the geographic location of the collection points, the geographic location of assets, including the power lines of the power distribution system, or a combination thereof. If the geographic region is defined with reference to the geographic location of the collection points, the geographic region may include predefined areas around each of the collection points. If the geographic region is defined with reference to the geographic location of the assets, the geographic region may include predefined areas around each of the lines connecting the collection points and any assets associated with or located between the collection points.

In some instances, the system may determine that although the waveform for collection point C is not similar enough to the waveforms for collection points A, B, and D to include collection point C in the same set of collection points (i.e., it does not correlate closely enough to waveform 402A), that waveform 402C loosely correlates to waveform 402A. The system may consider the geographic location for collection point C and how it relates to the geographic region for collection points A, B, and D. If the geographic location for collection point C is adjacent or nearby the geographic region for collection points A, B, and D, then the geographic region may be modified to include the geographic location for collection point C. If the geographic location for collection point C is located a significant distance from the geographic region for collection points A, B, and D, then it may not be added to the geographic region. A nearby geographic location may provide more relevant information than a distant location, since a distant location may be more likely to be associated with a different substation or an unrelated portion of the distribution network. A machine-learning model may be used to determine the geographic region or to determine when to include a nearby location in a geographic condition.

Exemplary Method for Addressing Distribution Network Problem

Figure 4:
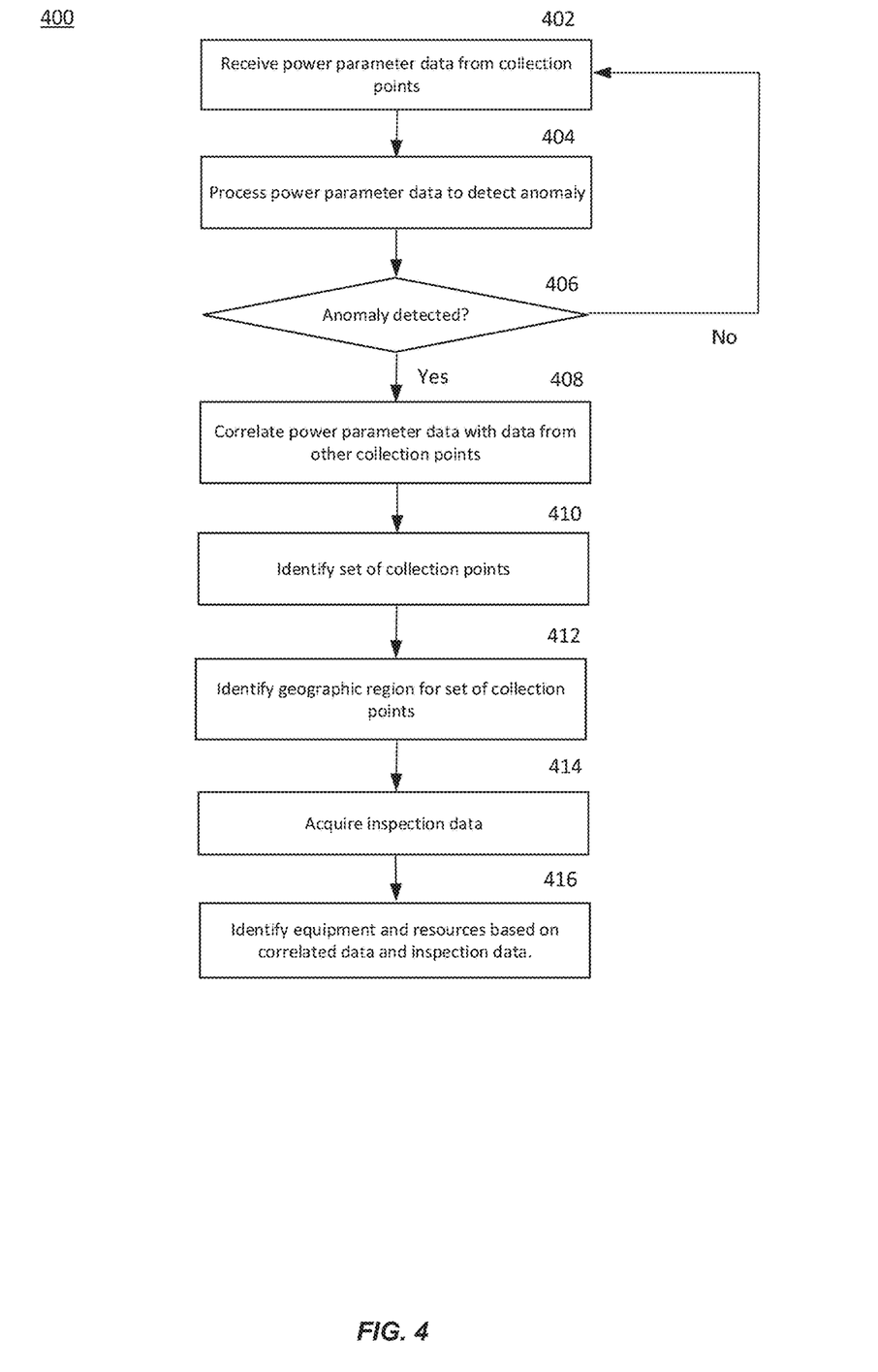
FIG. 4 is a flow chart illustrating an exemplary method for identifying and deploying equipment and resources.

FIG. 4 illustrates an example of a method for identifying and deploying equipment and resources to address a problem in the distribution system. Prior to the execution of the method, the system obtains topology information for the distribution system. In 402, the headend system receives data from one or more collection points. The data may include power parameter data. In some cases, the collection points regularly send their power parameter data. In other cases, the collection points analyze their collected power parameter data to determine if the data indicates an anomaly and only send their data when their analysis indicates a potential problem. In other cases, the system may send a request to the collection points to send their collected power parameter data. There may also be special cases where the collection points send their data as soon as they detect a certain condition or characteristic, such as a characteristic indicating an outage. The system may use one or more of these approaches to obtain the data. For example, if the collection points are configured to only send power parameter data when their analysis indicates a potential problem, then once the headend system receives power parameter data from one collection point, it may request power parameter data from other collection devices. Alternatively, the collection points may be configured to regularly send their data based on a schedule and to send data immediately if a certain condition is detected.

In analyzing the data, the collection points or the system receiving the data may use waveform signatures and/or one or more predetermined ranges or thresholds of various parameter values to determine if the data indicates a potential problem or anomaly. If the determination at 406 is that there is no anomaly, then the method returns to block 402 to await receipt of additional power parameter data.

Blocks 404-406 illustrate the option where the system regularly receives power parameter data from the collection points and processes the data to determine if the data represents an anomaly. When there is an anomaly in 406, the system correlates the data with data received from other collection points in 408. Based on the correlation, the system identifies other collection points experiencing similar conditions as a set of collection points in 410. Once the system identifies the set of collection points, the system uses the topology information to identify an inspection zone or geographic region that includes the set of collection points in 412. If the system identifies a collection point with power parameter data that loosely correlates with the set, then the system may select the geographic region so that it includes the geographic location of that collection point as well.

The system acquires inspection data related to the geographic region in 414. The inspection data may be acquired by deploying a UAV to the geographic region and receiving visual as well as other types of data acquired by the UAV as it traverses the region. The visual information may include image data for the portion of the distribution network in the geographic region and other elements in the surrounding area. The UAV may be configured to obtain image data that meets certain criteria, such as an image taken within a certain distance of an asset or from a certain angle. The criteria may also specify when multiple images of a single asset or condition may be required and how the multiple images relate to one another.

After acquiring the inspection data, the system or a system operator determines whether a problem exists and if so, what type of equipment and resources, including personnel, are needed to address the problem in 416. The determination is based on both the collected power parameter data and the inspection data. For example, the equipment and personnel needed to address a problem caused by a tree branch touching a line may be different than that needed to address a failed transformer. Once the equipment and resources are identified, they are deployed to the appropriate location.

One example of an anomaly is a localized outage caused by a failed asset, such as a failed transformer or a downed line. The power parameter data collected by the collection points located downstream of the asset may reflect the outage, while the power parameter data collected by collection points located in other portions of the distribution network may not reflect the outage or may reflect only a temporary outage. The headend system may analyze the data and determine the collection points with correlating data. The system may also determine the location of the collection points with correlating data using the topology information. Based on the topology information, the system may identify one or more assets located upstream of the collection points with correlating data. The system may identify a geographic region that includes the geographic locations of the collection points associated with the correlated data and the upstream asset(s). A UAV is deployed to the geographic region and sends image data acquired from the geographic region back to the headend system. The system may process the image data to identify certain types of assets or conditions. If the type of asset or condition is recognized from the image data, then the system may determine a cause of the problem, a location or a geographic sub-region associated with the problem, and identify equipment or resources needed to address the problem. If the image data indicates that the failed asset is a transformer, then a replacement transformer, as well as the equipment and resources needed to replace the transformer may be deployed to the location in the distribution network where the failed transformer is located. If the image data indicates that the failure is a downed line, then the equipment and resources needed to repair and replace the line are deployed to the sub-region where the line is down.

Another example is a localized transitory out-of-range voltage caused by vegetation contacting a section of the power lines. The power parameter data collected by the collection points located in the vicinity may reflect an anomaly corresponding to an intermittent out-of-range voltage or possibly intermittent outages. The headend system may analyze the data received from the collection points and identify a set of collection points with data that correlate. The correlation may consider the magnitude of the detected voltages, the time or the interval when the magnitude is initially determined to be out-of-range, the duration of time or the number of intervals where the magnitude remains out-of-range, or any other factors determined to be indicative of a vegetation problem.

The system may identify a geographic region that includes the geographic locations of the collection points associated with the correlated data. A UAV is deployed to the geographic region and sends image data acquired from the geographic region back to the headend system. If the image data indicates that vegetation surrounding the lines in a certain area requires maintenance, then the equipment and resources needed to perform the maintenance may be deployed to the area. The timing of the deployment may be coordinated with a maintenance schedule so that the equipment and resources are deployed according to the next scheduled maintenance. Alternatively, the equipment and resources may be deployed as soon as possible given other demands on the equipment or resources that may have a higher priority.

The system may consider data or other factors beyond the power parameter data and the image data to identify an anomaly. The system may consider weather conditions since a storm or high winds may increase the chance that vegetation contacts a section of the power lines. The information related to the weather conditions may be received from the UAV or may be obtained from another system that records and maintains weather or environmental data.

In some implementations, the UAV includes a communication device that is capable of communicating with a collection point over a communications network, such as a wireless mesh network. When the UAV is traversing the geographic region, it may come within range of a collection point that is no longer joined to a communications network. The collection point may have communicated through a parent node that is no longer operational and it may have been unable to locate another parent node. If the collection point is able to communicate with the UAV, then the UAV may receive power parameter data or other data from the collection point that may be used to assess the anomaly. The data received from the collection point may be transmitted to the headend system as part of the inspection data.

The UAV may collect any type of data that may be helpful in assessing a problem. Image data may include, but is not limited to photography, motion videography, or specialized capabilities such as infrared or radio frequency imaging. Other types of data include, but are not limited to data received from a collection point and environmental data. The UAV may transmit data to the headend system while it is traversing the geographical region or once it has completed its inspection. The route or inspection zone of the UAV may be modified while the UAV is deployed. If the UAV transmits inspection data while it is deployed, then the inspection zone may be modified based on the data received. In some systems, there may be multiple UAVs and multiple locations from which a UAV may be deployed.

Exemplary Machine-Learning Models

There may be one or more machine-learning models operating in the systems and devices described above. The models may include, but are not limited to, a model for identifying characteristics of one or more power parameters that indicate an anomaly at the head-end system or a collection point, a model for determining specific types of problems based on the power parameter data and/or the inspection data, a model for determining a geographic region for inspection by the UAV and/or navigating the UAV in the geographic region, and a model for determining certain types of equipment or resources based on specific types of problems.

The models that identify characteristics of the power parameters that indicate an anomaly may be implemented using a regression model. Both linear and non-linear regression models may be used. Each regression model may be trained and validated using a data set. The data set is based on power parameter data collected from prior time periods across a variety of conditions, dates and times. The conditions, dates and times may be used to define the model inputs and the historical anomalies or problems may be used to define the model output. The data set used for a model that operates at a collection point may differ from the data set used for a model that operates at a headend system.

The data set is divided into a training data set and a validation data set. The training data set is used to train the regression model and the validation data set is used to validate the trained model. During training and validation, the weights used in the model are adjusted until the model provides an acceptable level of accuracy. One option to measure the accuracy of the model include determining the percentage of times that the model correctly predicts an anomaly. Once the model is validated, it may be deployed to the collection point or to the headend system. The performance of the deployed model is monitored and additional data is collected, so that the model may be retrained using a new data set, as desired. The retrained model may then be deployed to replace the original model.

A model that determines the types of equipment or resources to deploy may use a training set that includes different types of data than the data used with a model that identifies characteristics that correspond to an anomaly. The data set may be based on power parameter data or anomalies, inspection data, maintenance and repair data, and power asset data collected from prior time periods across a variety of conditions, dates and times. The power parameter data or anomalies, the inspection data, and the power asset data may be used to define the model inputs and the historical maintenance and repair data may be used to define the model outputs.

Figure 5:
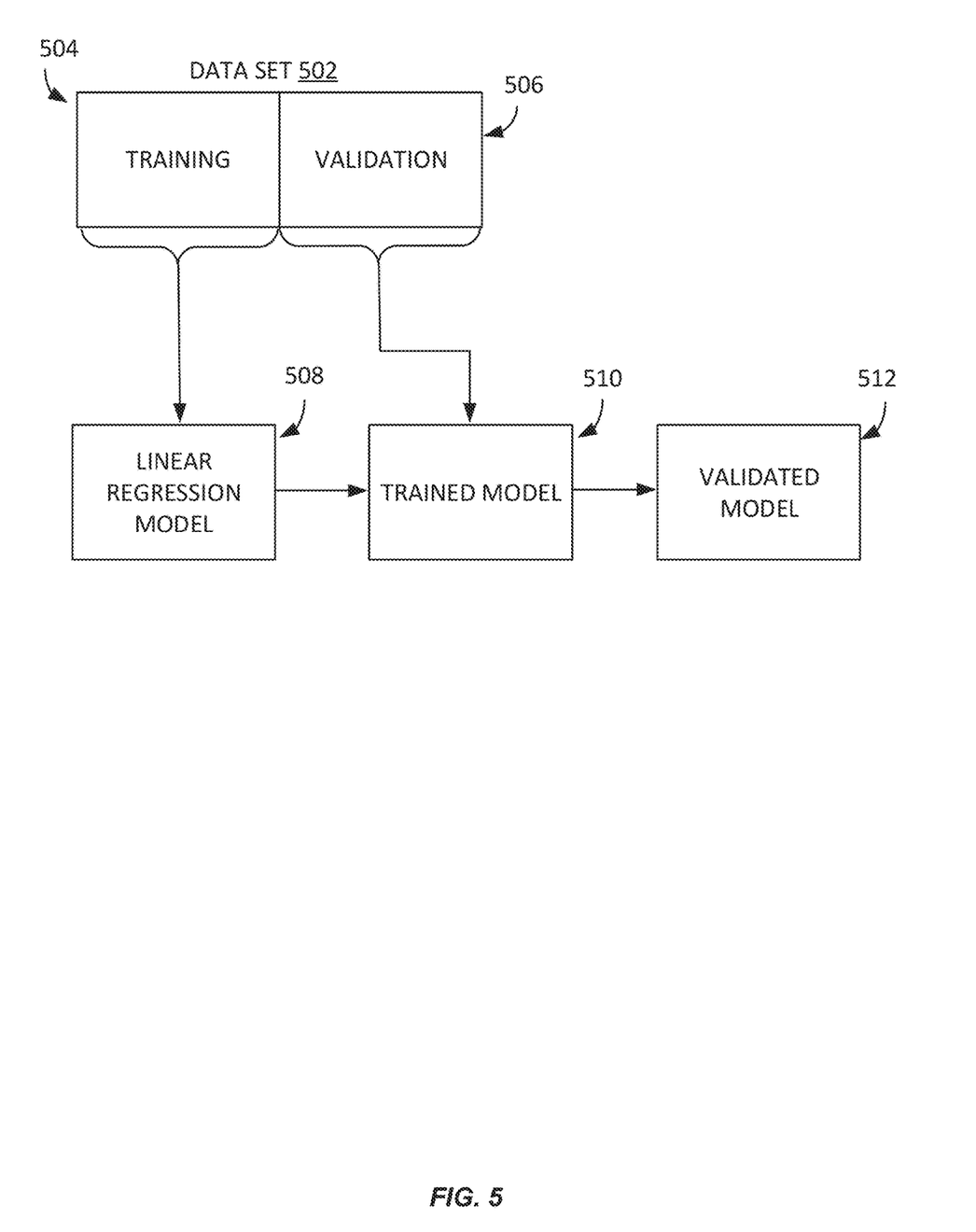
FIG. 5 is a block diagram illustrating an exemplary method for generating a machine-learning model.

FIG. 5 illustrates an exemplary method for training and validating a linear regression model for one or more models that may be used in the system. Data set 502 includes a training data set 504 and a validation data set 506. The training data set is used to train linear regression model 508. Once a trained model 510 is available, the validation data set is used to validate the trained model. The process to train and validate the model includes a number of additional steps that are not shown in FIG. 5, such as adjusting the weights used in the model to improve the accuracy of the price output during both training and validation. Once the model is validated 512, it may be deployed.

The collection point may include a communication module, a processor, memory, and measurement circuitry for collecting the power parameter data. The processor controls the functions performed by the collection point. The memory stores data needed by the processor to perform its functions, other data generated by the collection point, and optionally one or more validated machine-learning models. The collection point may include computer-executable instructions stored in the memory or in another type of computer-readable medium and the processor may execute the instructions to provide the functions described herein. The collection point may also include additional modules or components. For example, the collection point may include sensors or if the collection point is a meter, it may include additional metrology components.

The headend system may include one or more communication modules, one or more processors, and memory. The headend system may also include or be in communication with one or more data storage devices, which store data received from the collection points and the UAV, topology information, and other data. The one or more processors control the functions performed by the headend system. The memory stores data needed by the processors to perform its functions, data generated by the headend system, and optionally one or more validated machine-learning models. Computer-executable instructions may be stored in the memory or in another type of computer-readable medium and the one or more processors may execute the instructions to provide the functions described herein. The headend system may also include additional modules or components.

The UAV may include a camera or other type of image capture device, a communication module, a processor, memory, and navigation controls. To support communications with a headend system, an operator that may be piloting the UAV, and a collection point, the communication module may be configured to communicate on multiple communications networks or the UAV may include multiple communications modules. The processor controls the functions performed by the UAV. The memory stores data needed by the processor to perform its functions, other data generated or collected by the UAV, and optionally one or more validated machine-learning models. Computer-executable instructions may be stored in the memory or in another type of computer-readable medium and one or more processors may execute the instructions to provide the functions described herein. The UAV may also include additional modules or components, such as sensors to detect environmental conditions.

In some implementations, the systems are fully automated so that the collection points, headend system, and UAV operate without requiring manual input. For example, the operations described in connection with FIG. 4 may be performed automatically. In other implementations, one or more of the operations may require manual oversight or manual input. Various combinations of automated and manual operations in a single system are possible.

In one implementation, the UAV may automatically navigate the geographic region and collect the inspection data, whereas in a different implementation a system operator may control the navigation or the data collection of the UAV. In another example, the headend system may automatically identify equipment and resources in one system, whereas a system operator may select the equipment and resources in a different system.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method of identifying an anomaly in a resource distribution system, comprising:
   providing topology information for at least a portion of a power distribution system, wherein the topology information includes geographic location information for a plurality of collection points and a plurality of power assets within the power distribution system;
   receiving power parameter data from the collection points via a communications network, wherein the power parameter data corresponds to data collected by the collection points over a plurality of intervals; and
   processing the power parameter data by:
      processing the power parameter data received from a first collection point to determine whether the power parameter data received from the first collection point includes a first predetermined characteristic that corresponds to a first anomaly within a first set of intervals;
      selecting a second collection point when the power parameter data received from the first collection point includes the first predetermined characteristic;
      determining whether the power parameter data received from the second collection point correlates to the power parameter data received from the first collection point;
      using the topology information to determine a geographic region that includes a geographic location for the first collection point and a geographic location for the second collection point when the power parameter data received from the second collection point correlates to the power parameter data received from the first collection point;
      deploying an unmanned aerial vehicle (UAV) to the geographic region;
      receiving inspection data from the UAV, wherein the inspection data includes images of a subset of the power assets of the power distribution system; and
      identifying, based on the first anomaly and the inspection data, a first resource and a first geographic sub-region,
   wherein the topology information includes relative location information for the collection points and the power assets in the resource distribution system, and wherein selecting a second collection point comprises:
      identifying a common power asset located upstream of the first collection point;
      identifying a subset of the collection points located downstream of the common power asset; and
      selecting the second collection point from the subset of the collection points.

2. The method of claim 1, wherein the inspection data includes power parameter data received from a third collection point within the geographic region received by the UAV.

3. The method of claim 1, wherein the geographic region includes a geographic location of the common power asset.

4. The method of claim 1, wherein the power parameter data is regularly received from the collection points.

5. The method of claim 1, wherein the first predetermined characteristic corresponds to a voltage outside a predetermined range of voltages for a predetermined number of intervals.

6. The method of claim 1, wherein the first resource is a replacement transformer and the first geographic sub-region includes a geographic location of a failed transformer.

7. The method of claim 1, further comprising:
   processing the power parameter data received from the first collection point to determine whether the power parameter data received from the first collection point includes a second predetermined characteristic that corresponds to a second anomaly; and
   storing an indication of the second anomaly, including a time associated with a start of the second anomaly and a time associated with a duration of the second anomaly when the power parameter data received from the first collection point includes the second predetermined characteristic that corresponds to a second anomaly.

8. The method of claim 7, further comprising:
   based on determining that the power parameter data received from the first collection point includes the second predetermined characteristic that corresponds to the second anomaly, including the geographic location of the first collection point in a second geographic region;
   deploying the unmanned aerial vehicle (UAV) to the second geographic region; and
   receiving additional inspection data from the UAV, wherein the additional inspection data includes images of a power asset operably connected to the first collection point.

9. A method of responding to an outage in a resource distribution system, comprising:
   providing topology information for at least a portion of a power distribution system, wherein the topology information includes geographic location information for a plurality of collection points and a plurality of power assets within the power distribution system;
   receiving power parameter data from the collection points via a communications network, wherein the power parameter data received from a first collection point includes a characteristic indicative of an outage;
   processing the power parameter data by:
      identifying a second collection point in response to receiving the power parameter data indicative of an outage from a first collection point, wherein the first and the second collection points have a common upstream power asset; and
      comparing the power parameter data for the first collection point with the power parameter data for the second collection points to determine whether the power parameter data received from the first collection point correlates to the power parameter data received from the second collection point;
   using the topology information to determine a geographic region that includes a geographic location for the first collection point, a geographic location for the second collection point, and a geographic location for the common upstream power asset when the power parameter data received from the first collection point correlates to the power parameter data received from the second collection point;
   deploying an unmanned aerial vehicle (UAV) to the geographic region;

receiving inspection data from the UAV, wherein the inspection data includes images of a subset of the power assets of the power distribution system, including the common upstream power asset; and identifying a first replacement resource and a first geographic sub-region based in part on the power parameter data for the first and second collection points and the inspection data, wherein the topology information includes relative location information for the collection points and the power assets, and wherein identifying a second collection point comprises:

identifying a common upstream power asset located upstream of the first collection point;

identifying a subset of the collection points located downstream of the common upstream power asset; and selecting the second collection point from the subset of the collection points.

10. The method of claim 9, wherein the inspection data includes power parameter data received from a third collection point within the geographic region received by the UAV.

11. The method of claim 9, wherein the first replacement resource is a replacement transformer and the first geographic sub-region includes a geographic location of a failed transformer.

12. A system for identifying an anomaly in a resource distribution system comprising:

a headend system configured for:

storing topology information for the resource distribution system;

receiving power parameter data from a plurality of collection points distributed within a resource distribution system;

analyzing the power parameter data received from the collection points to identify a set of the collection points, wherein there is a correlation in the power parameter data for the set of the collection points and the power parameter data for the set of the collection points corresponds to an anomaly;

determining a geographic region that includes geographic locations for the collection points in the set of the collection points using the topology information; and receiving inspection data from an unmanned aerial vehicle (UAV) deployed to the geographic region; and the UAV configured for:

traversing the geographic region;

collecting inspection data from the geographic region; and transmitting the inspection data to the headend system, wherein a first resource and a first geographic sub-region are identified based on the anomaly and the inspection data, wherein analyzing the power parameter data received from the collection points comprises:

determining that the power parameter data from a first collection point includes a first predetermined characteristic that corresponds to the anomaly;

selecting a second collection point comprising:

identifying a power asset located upstream of the first collection point;

identifying a subset of the collection points located downstream of the power asset; and selecting the second collection point from the subset of the collection points; and determining whether the power parameter data from the second collection point correlates to the power parameter data from the first collection point.

13. The system of claim 12, wherein the inspection data includes power parameter data received from a collection point within the geographic region by the UAV.

14. The system of claim 12, wherein the topology information includes relative location information for the collection points and power assets in the resource distribution system, and wherein determining a geographic region further comprises:

identifying a common upstream power asset located upstream of the set of the collection points; and including a geographic location for the common upstream power asset in the geographic region.

15. The system of claim 12, wherein the first resource is a replacement transformer and the first geographic sub-region includes a geographic location of a failed transformer.

16. The system of claim 12, wherein the power asset is a transformer, the first collection point is a meter and the second collection point is a meter.

* * * * *